United States Patent
Loehden et al.

(10) Patent No.: US 8,053,522 B2
(45) Date of Patent: *Nov. 8, 2011

(54) SYNTHESIS OF POLYESTER-GRAFT-POLY(METH)ACRYLATE COPOLYMERS

(75) Inventors: Gerd Loehden, Essen (DE); Sven Balk, Hanau (DE); Thorsten Brand, Marl (DE); Gabriele Brenner, Duelmen (DE); Thomas Arnold, Gelnhausen (DE); Cornelia Baumann, Linsengericht (DE)

(73) Assignee: Evonik Roehm GmbH, Darmstadt (DE)

( * ) Notice: Subject to any disclaimer, the term of this patent is extended or adjusted under 35 U.S.C. 154(b) by 445 days.

This patent is subject to a terminal disclaimer.

(21) Appl. No.: 12/160,214

(22) PCT Filed: Dec. 21, 2006

(86) PCT No.: PCT/EP2006/070075
§ 371 (c)(1),
(2), (4) Date: Jul. 8, 2008

(87) PCT Pub. No.: WO2007/098819
PCT Pub. Date: Sep. 7, 2007

(65) Prior Publication Data
US 2009/0048401 A1    Feb. 19, 2009

(30) Foreign Application Priority Data
Feb. 28, 2006    (DE) .................... 10 2006 009 511

(51) Int. Cl.
*C08L 67/06* (2006.01)
*C09D 133/06* (2006.01)
*C09J 167/00* (2006.01)
(52) U.S. Cl. ........................................... 525/63
(58) Field of Classification Search ............ 525/63
See application file for complete search history.

(56) References Cited

U.S. PATENT DOCUMENTS

| | | | |
|---|---|---|---|
| 5,258,355 A * | 11/1993 | Bloodworth et al. ......... 503/227 |
| 5,794,403 A | 8/1998 | Oberlander et al. |
| 6,498,209 B1 | 12/2002 | Loehden et al. |
| 6,566,441 B1 | 5/2003 | Lohden et al. |
| 6,809,163 B2 | 10/2004 | Schultes et al. |
| 6,989,409 B2 | 1/2006 | Loehden et al. |
| 2002/0016407 A1 * | 2/2002 | Buter et al. ................... 524/558 |
| 2004/0044117 A1 | 3/2004 | Kiefer-Liptak et al. |
| 2007/0068088 A1 | 3/2007 | Einfeldt et al. |
| 2007/0117948 A1 | 5/2007 | Loehden et al. |
| 2007/0193156 A1 | 8/2007 | Kautz et al. |
| 2007/0193159 A1 | 8/2007 | Schattka et al. |
| 2007/0196655 A1 | 8/2007 | Schattka et al. |
| 2007/0208107 A1 | 9/2007 | Schattka et al. |
| 2007/0208109 A1 | 9/2007 | Kautz et al. |
| 2007/0259987 A1 | 11/2007 | Schattka et al. |
| 2008/0057205 A1 | 3/2008 | Lohden et al. |
| 2008/0237529 A1 | 10/2008 | Schattka et al. |
| 2008/0262176 A1 | 10/2008 | Loehden et al. |
| 2008/0292893 A1 | 11/2008 | Loehden et al. |
| 2008/0293854 A1 | 11/2008 | Schattka et al. |
| 2009/0062508 A1 | 3/2009 | Balk et al. |

FOREIGN PATENT DOCUMENTS

| | | |
|---|---|---|
| CN | 1430657 A | 7/2003 |
| DE | 40 15 018 | 8/1991 |
| EP | 0 542 105 | 5/1993 |
| WO | 01 90265 | 11/2001 |

OTHER PUBLICATIONS

U.S. Appl. No. 12/673,348, filed Feb. 12, 2010, Brenner, et al.
U.S. Appl. No. 12/992,184, filed Nov. 11, 2010, Koschabek, et al.

* cited by examiner

Primary Examiner — Jeffrey Mullis
(74) Attorney, Agent, or Firm — Oblon, Spivak, McClelland, Maier & Neustadt, L.L.P.

(57) ABSTRACT

The present invention relates to a novel synthesis of (meth)acrylate-grafted polyesters and their action as compatibilizers.

13 Claims, No Drawings

SYNTHESIS OF POLYESTER-GRAFT-POLY(METH)ACRYLATE COPOLYMERS

FIELD OF THE INVENTION

The present invention relates to a novel synthesis of (meth)acrylate-grafted polyesters. A crucial advantage of the materials described is the product preparation without incorporation of styrenes and the simple synthesis.

In particular, the novelty of the present invention lies in the controlled activation of repeat itaconate units in polyesters to give multifunctional initiators for the free-radical polymerization of acrylates, methacrylates or mixtures thereof. It has been found that, surprisingly, no addition of styrene or styrenic derivatives is necessary for such a polymerization to perform a successful graft.

Moreover, the determination of a suitable itaconate content in the polyester used forms part of the subject-matter of the present invention. In the case of too high a double bond content, crosslinking reactions occur. In the case of too low a double bond content, the proportion of graft copolymers formed in the product mixture is too low.

STATE OF THE ART

The synthesis of polymer architectures which are based on a combination of polyesters and poly(meth)acrylates has already been a theme of industrial research since the mid-1960s. The potential uses of such materials include, for example, dispersants (see, for example, EP 1 555 174), impregnants (GB 1,007,723), binders for coatings (for example described in DE 1 006 630, JP 09 216 921 or DE 4 345 086) or for adhesive compositions (for example in DE 1 006 630).

First descriptions of the simultaneous synthesis of polyesters and polymethacrylates exist from as early as 1963. GB 1,007,723 describes the simultaneous free-radical polymerization of (meth)acrylates and the polycondensation of diacids and diols to polyesters. The addition of itaconic acid is also detailed. However, it is only described with regard to a possible copolymerization into (meth)acrylate fraction.

In DE 1 006 630 an analogous in situ polymerization process is selected for the production of adhesive compositions. In the description, the addition of itaconic acid to the reaction mixture is likewise specified, and the possible presence of graft copolymers in the product is outlined.

However, both inventions relate to uncontrolled processes which lead to product mixtures with a multitude of very different components. It is readily apparent to the person skilled in the art that the free-radical polymerization performed in situ under the conditions of a condensation polymerization must lead to side reactions such as partial gelling of the products. However, such crosslinkings are highly disadvantageous for the product processing even in the case of only low occurrence. The aim of the present invention, in contrast, is the controlled synthesis of graft copolymers which firstly lead to ungelled products and secondly comprise exclusively the particular polyester and poly(meth)acrylate homopolymers as by-products.

The means of controlled combination of poly(meth)acrylates and polyesters are various. In addition to the inventive graft copolymers with polyester main chains and (meth)acrylate side chains, an inverse polymer architecture of a poly(meth)acrylate-graft-polyester is also obtainable by means of the so-called "macromonomer method" (described in EP 1 555 274). However, the properties of these products differ fundamentally from the inventive graft copolymers.

The controlled grafting-on of (meth)acrylates is effected predominantly on polyesters which have olefinic groups within the main chain. These have usually been introduced by incorporating the butenedioic acids maleic acid and fumaric acid, or maleic anhydride. It is common knowledge among those skilled in the art that methacrylates and acrylates cannot be grafted directly onto these olefinic groups. Therefore, use is made of a small addition of styrene or styrene-like compounds which can both be copolymerized with (meth)acrylates and be grafted onto the olefinic bonds of repeat maleic acid or fumaric acid units. The grafting onto maleic acid-containing polyesters is described, for example, in DE 4 427 227, DE 4 345 086, WO 2005/059 049 and in Zhu et al., Angew. Makrom. Chem. (171, p. 65-77, 1989). Corresponding reactions with repeat fumaric acid units can be looked up in DE 2 951 214, JP 09 216 921 and in Shimizu et al., J. of Appl. Polym. Sci. (76, p. 350-356, 2000). It should be noted that some of the documents cited mention unsaturated polyesters in general. However, it is always evident from the examples and the subclaims that itaconic acid has not been used or tested. Styrene was also copolymerized in all documents cited to achieve the object stated.

However, the incorporation of styrene leads to some disadvantages of the product. Firstly, free-radical polymerization is never effected with complete conversion of all monomers. In the case of various applications, for example in sectors with food contact or in objects with which children can come into direct contact, aromatic residual monomers, however, are undesired. For these reasons, a synthesis method which can be undertaken without incorporation of such free-radically polymerizable aromatics is clearly preferred. An additional factor is the odour nuisance in the course of later processing which often originates from aromatic residual monomers.

EP 0 631 198 likewise describes the grafting of styrene-containing methacrylate mixtures onto polyesters modified with itaconic acid. In this patent, the exemplary polyesters have a relatively high itaconate content. It is readily apparent to the person skilled in the art that the use of materials with a particularly high content of free-radically polymerizable groups in the prepolymer must lead to crosslinkings and gellings. A disadvantage of such polymers is a significant increase in the material viscosity, which in turn leads to poor processibility of the material.

U.S. Pat. No. 3,978,261 describes the synthesis of (crosslinked) core-shell particles with initiation of a free-radical polymerization starting from polyesters with unsaturated groups. The synthesis is effected exclusively with additional incorporation of glycidyl methacrylate. The preparation of graft copolymers is not part of the patent.

Hereinafter, the term (meth)acrylate refers to monomers from the group of the acrylates and/or the methacrylates and/or mixtures of acrylates, methacrylates or both.

OBJECT

It was an object of the present invention to synthesize a mixture of poly(meth)acrylates, polyesters and copolymers of polyesters and polymethacrylates.

In particular, it was an object of the present invention to synthesize polymer architectures based on polyester-graft-poly(meth)acrylate copolymers as said copolymers. Moreover, it was an object to prepare a product free of styrene and styrene analogues, and to develop a very simple synthesis process.

The inventive graft copolymers should serve primarily as compatibilizers between poly(meth)acrylates and polyesters. It is therefore an object to prepare a mixture of polyesters, poly(meth)acrylates and polyester-graft-poly(meth)acrylate copolymers.

SOLUTION

The object is achieved by a free-radical polymerization of suitable components to give polymer type B. This polymerization is performed in the presence of polymer type A in such a way that polymer type AB can form in addition. This object was achieved by a composition of three different polymer types A, B and AB,
- polymer type A being a copolyester which has been prepared by cocondensation of itaconic acid,
- polymer type B being a (meth)acrylate homo- and/or copolymer, and
- polymer type AB being a graft copolymer composed of polymer type A and polymer type B.

It has been found that, surprisingly, the use of styrene or styrene derivatives can be dispensed with.

One advantage of the present invention over the prior art is that the grafting of the polyesters is onto chemically more active C—C double bonds projecting from the polymer chain. To this end, polyesters into which itaconic acid has been copolymerized are used. There have to date been descriptions of graftings of such materials with (meth)acrylates. These can be looked up, for example, in JP 60 175 045, JP 48 043 144 or in EP 0 631 198. However, it is clearly evident from the description and the examples in the documents cited that the synthesis is effected exclusively with copolymerization with styrene.

Polymer Type A

According to the invention, the polymer type A used is copolyesters which feature itaconic acid as a monomer unit. The copolyesters in the context of the invention have a linear or branched structure and are characterized by
- OH numbers of 5 to 150 mg KOH/g, preferably of 10 to 50 mg KOH/g
- acid numbers of below 10 mg KOH/g, preferably below 5 mg KOH/g and more preferably below 2 mg KOH/g
- a number-average molecular weight of 700-25 000 g/mol, preferably 2000-12 000 g/mol.

The content of itaconic acid in the inventive polyesters is in the range between 0.1 mol % and 20 mol %, preferably between 1 mol % and 10 mol % and most preferably between 2 mol % and 8 mol %, based on the total amount of polycarboxylic acids used. Otherwise, the type of polycarboxylic acids used for the inventive copolyesters is arbitrary per se. For instance, aliphatic and/or cycloaliphatic and/or aromatic polycarboxylic acids may be present. Polycarboxylic acids are understood to mean compounds which bear preferably more than one and more preferably two carboxyl groups; departing from the general definition, this is also understood to mean monocarboxylic acids in particular embodiments.

Examples of aliphatic polycarboxylic acids are succinic acid, glutaric acid, adipic acid, azelaic acid, sebacic acid, dodecanedioic acid, tetradecanedioic acid, octadecanedioic acid. Examples of cyclocliphatic polycarboxylic acids are the isomers of cyclohexane-dicarboxylic acid. Examples of aromatic polycarboxylic acids are the isomers of benzenedicarboxylic acid and trimellitic acid. If appropriate, it is also possible to use, instead of the free polycarboxylic acids, their esterifiable derivatives, for example corresponding lower alkyl esters or cyclic anhydrides.

The type of the polyols used for the inventive hydroxy polyesters is arbitrary per se. For instance, aliphatic and/or cycloaliphatic and/or aromatic polyols may be present. Polyols are understood to mean compounds which bear preferably more than one and more preferably two hydroxyl groups; departing from the general definition, this is also understood to mean monohydroxy compounds in particular embodiments.

Examples of polyols are ethylene glycol, propanediol-1,2, propanediol-1,3, butanediol-1,4, pentanediol-1,5, hexanediol-1,6, nonanediol-1,9, dodecanediol-1,12, neopentyl glycol, butylethylpropanediol-1,3, methyl-propanediol-1,3, methylpentanediols, cyclohexane-dimethanols, trimethylolpropane, pentaerythritol and mixtures thereof.

Aromatic polyols are understood to mean reaction products of aromatic polyhydroxy compounds, for example hydroquinone, bisphenol A, bisphenol F, dihydroxynaphthalene, etc., with epoxides, for example ethylene oxide or propylene oxide. The polyols present may also be ether diols, i.e. oligomers or polymers, for example based on ethylene glycol, propylene glycol or butanediol-1,4. Particular preference is given to linear aliphatic glycols.

In addition to polyols and dicarboxylic acids, it is also possible to use lactones for the synthesis of the hydroxy polyesters.

The inventive copolyesters with itaconic acid contents between 0.1 mol % and 20 mol %, preferably between 1 mol % and 10 mol % and most preferably between 2 mol % and 8 mol %, based on the total amount of polycarboxylic acids used, are prepared by means of established techniques for (poly)condensation reactions. They can be obtained, for example, by condensation of polyols and polycarboxylic acids or their esters, anhydrides or acid chlorides in an inert gas atmosphere at temperatures of 100 to 260° C., preferably of 130 to 240° C., in the melt or in an azeotropic method, as described, for example, in Methoden der Organischen Chemie [Methods of Organic Chemistry] (Houben-Weyl), Vol. 14/2, 1-5, 21-23, 40-44, Georg Thieme Verlag, Stuttgart, 1963, in C. R. Martens, Alkyl Resins, 51-59, Reinhold Plastics Appl., Series, Reinhold Publishing Comp., New York, 1961 or in DE-A 27 35 497 and 30 04 903.

The amounts of polymer type A which are used in the inventive mixture before the graft reaction are between 10% by weight and 90% by weight, preferably between 25% by weight and 75% by weight and most preferably between 40% by weight and 60% by weight.

The amounts of polymer type A which are present in the inventive mixture after the reaction are between 5% by weight and 80% by weight, preferably between 5% by weight and 60% by weight, and most preferably between 5% by weight and 40% by weight.

Polymer Type B

Polymer type B may be formed as a by-product in the synthesis of the graft copolymer AB. The composition of the B chains in the product constituent AB likewise corresponds to the following description:

Polymer type B or chain segment B consists by definition of polyacrylate and/or polymethacrylate sequences. Taken alone, for example in the form of a corresponding homo- or copolymer, these are soluble in the solvent system L. The polymer B is generally formed to an extent of more than 50% by weight, preferably to an extent of 80% by weight to 100% by weight, from monomers of the formula I

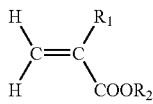

I in which $R_1$ is hydrogen or methyl and $R_2$ is an alkyl radical, an aliphatic or aromatic radical having 1 to 30 carbon atoms, preferably 1 to 20 carbon atoms.

Polymer B may further contain, as units:
monomers of the formula II

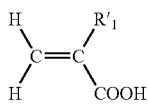

II in which $R'_1$ is hydrogen or methyl or/and polymerizable acid anhydrides and/or monomers of the formula III

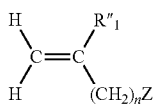

III in which $R''_1$ is hydrogen or methyl and Z is a $—COR_3$ radical, an

radical, an $—OR_4$ radical or a chlorine atom, and in which $R_3$ and $R_4$ are each an optionally branched alkyl radical having 1 to 20 carbon atoms or a phenyl radical, and n is 0 or 1, and/or monomers of the formula IV

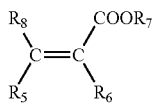

IV in which $R_5$ and $R_6$ are each hydrogen or a $—COOR'_7$ radical, $R_6$, hydrogen or a $—CH_2COOR''_7$ radical, with the proviso that the compound of the formula IV must contain two carboxyl-containing groups and in which $R_7$, $R'_7$ and $R''^7$ are each hydrogen or an optionally branched alkyl radical having 1 to 20 carbon atoms or phenyl. The polymer B may optionally also contain fractions of the monomers of the formula V

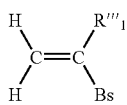

V in which $R_{11}$ is as defined for $R_1$ and Bs is a nitrogen-containing functional radical such as a $—CN$ group, a $—CONR_9R_{10}$ group in which $R_9$ and $R_{10}$ are each independently hydrogen or an alkyl radical having 1 to 20 carbon atoms, or in which $R_9$ and $R_{10}$ including the nitrogen, form a heterocyclic 5- or 6-membered ring, or in which Bs is an (inert) heterocyclic radical, especially a pyridine, pyrrolidine, imidazole, carbazole, lactam radical, or alkylated derivatives thereof, or Bs is $—CH_2OH$, or in which Bs is

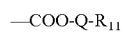

in which Q is an optionally alkyl-substituted alkylene radical having 2 to 8 carbon atoms and $R_{11}$ is $—OH$, $—OR'''_7$, or an $—NR'_9R'_{10}$ radical, where $R'''_7$, $R'_9$ and $R'_{10}$ are each as defined for $R_7$, $R_8$ and $R_9$, for example together with the nitrogen atom, if appropriate including a further heteroatom, form a five- to six-membered heterocyclic ring.

Examples of the monomers of the formula I include methyl methacrylate, ethyl methacrylate, propyl methacrylate, butyl methacrylate and isobutyl methacrylate. The monomers of the formula I are also referred to as standard methacrylates.

Examples of the monomers of the formula II include acrylic acid or methacrylic acid.

Examples of monomers of the formulae III and IV include particularly vinyl chloride, vinyl acetate, vinyl stearate, vinyl methyl ketone, vinyl isobutyl ether, allyl acetate, allyl chloride, allyl isobutyl ether, allyl methyl ketone, dibutyl maleate, dilauryl maleate, dibutyl itaconate. The content of the monomers of the formula II-V in the polymer B is generally between 0% by weight and 50% by weight, preferably 0% by weight to 20% by weight (based on the monomers of polymer B). The content of the monomers of the formulae II and/or V in the polymer B will generally not exceed 20% by weight, and is generally 0% by weight to 10% by weight, preferably 0% by weight to 5% by weight.

In the individual case, polymer B, depending on the content and composition, is appropriately selected with regard to the desired technical function.

It is also possible to polymerize monomers which lead to a polymer of type B in the simultaneous presence of a polymer type A and with addition of an initiator.

The amounts of monomers which are used in the inventive mixture to form polymer type B in the polymerization are between 10% by weight and 90% by weight, preferably between 25% by weight and 75% by weight and most preferably between 40% by weight and 60% by weight.

The amounts of polymer type B which are present in the inventive mixture after the reaction are between 5% by weight and 80% by weight, preferably between 5% by weight and 60% by weight and most preferably between 5% by weight and 40% by weight.

Polymer Type AB
Preparation of the Graft Copolymers AB

In the process according to the invention for preparing a graft copolymer AB, reaction of a suitable initiator described below with double bonds of repeat itaconate units in the polymer of type A forms a plurality of reactive (free-radical) centres for a free-radical polymerization of (meth)acrylates. These reactive centres can be formed simultaneously or else at different times. Thus, it is also entirely possible for itaconate units to be activated only after the free radicals formed on other itaconate units have been deactivated by termination reactions. Preference is therefore given to initially charging polymer A with the initiator and heating for a period between 10 min and 60 min before one or more of the monomers I-V described to form type B is added. It is also possible to initially charge the polymers of type A and the monomers I-V together to form type B before the polymerization is initiated.

The graft polymer AB is generally prepared by grafting component B onto component A under the reaction conditions suitable therefor. Polymer type AB is a graft copolymer with polyester main chains and poly(meth)acrylate side chains.

To this end, a 10% by weight-50% by weight, preferably 20% by weight-30% by weight, solution of the inventive polyester with repeat itaconate units is prepared in a suitable solvent which is inert under polymerization conditions and normally has a boiling point above the process temperature. The solvents used are the conventional solvents for solution polymerizations, which are suitable for the corresponding esters. For instance, acetate esters such as ethyl, propyl or butyl acetate, aliphatic solvents such as isooctane, cycloaliphatic solvents such as cyclohexane, and carbonylic solvents such as butanone are useful.

The content of the solvent or of the solvent mixture in the polymer dispersions concentrated in accordance with the invention may, for example, be 80% by weight, in a particularly favourable case down to 20% by weight, preferably below 70% by weight, in practice usually 60% by weight to 40% by weight.

The monomers of the formula I and possibly the other monomers II-V are added to the polyester solutions in the ratios specified and polymerized with addition of one or more preferably peroxidic free-radical initiators at temperatures of −10 degrees C. to 100 degrees C. within usually 4-8 hours. Essentially full conversion is desired. Preference is given to using azo compounds such as AIBN, or peresters such as tert-butyl peroctoate, as the free-radical initiator. The initiator concentration is guided by the number of desired graft sites and the desired molecular weight of segment B. In general, the initiator concentration is between 0.1% by weight and 3% by weight based on the polymer.

If appropriate, the desired molecular weight of the segments B can also be adjusted by using regulators. Suitable regulators are, for example, sulphur regulators, especially mercapto-containing regulators, for example dodecyl mercaptan. The concentrations of regulators are generally 0.1% by weight to 1.0% by weight based on the overall polymer.

In addition to the method of solution polymerization described, the synthesis of the graft copolymers of type AB can also be prepared by means of emulsion polymerization, mini- or microemulsion polymerization or bulk polymerization. For example, in the case of bulk polymerization, the polyesters are dissolved in the (meth)acrylic monomer mixture before the initiation of the free-radical polymerization. Alternatively, free-radical initiator can also be initially charged in a melt of the polyester and then admixed with the monomer mixture.

The amounts of polymer type AB after the graft reaction in the inventive mixture are between 10% by weight and 80% by weight, preferably between 20% by weight and 65% by weight and most preferably between 30% by weight and 50% by weight.

The average content of the poly(meth)acrylates in the polymer fraction of the overall mixture is between 20% by weight and 80% by weight, preferably between 30% by weight and 70% by weight and most preferably between 40% by weight and 60% by weight. These data are based on the sum of the poly(meth)acrylates of type B and the poly(meth)acrylate fractions in the graft copolymers of type AB.

It has been found that, surprisingly, polymer type AB is an outstanding compatibilizer between poly(meth)-acrylates and polyesters. The improvement in the compatibility between poly(meth)acrylates and polyesters leads to new material classes with positive improvements in properties, for example for the following uses: coating formulations, heat-sealing coatings or as prepolymers for the synthesis of elastomers which might in turn find use as a sealant.

EXAMPLES

The present invention is illustrated hereinafter with reference to examples and comparative examples. However, the invention is not restricted exclusively to these examples.
General Information on Product Characterization:

The values for the polydispersity index, PDI, reported in the tables which follow were determined by means of gel permeation chromatography. $PDI=M_w/M_n$=mass-average molecular weight/number-average molecular weight. The gel permeation chromatography characterization of all samples was effected in tetrahydrofuran as the eluent to DIN 55672-1. The distribution of the polyester fractions in the end product was determined by means of UV detection at a wavelength of 300 nm. The overall distribution was determined by means of RI detection.

The phase transition temperatures (e.g. glass transition temperatures $T_g$) were measured by means of DSC to DIN EN ISO 11357-1. The values reported were taken from a second heating cycle.

The content of repeat itaconate units in the copolyester (block) before and after the graft reaction was quantified by $^1$H NMR spectroscopy (500 MHz).

Before the characterization, the solvent was removed if appropriate by means of a rotary evaporator and the samples were dried overnight at 60° C. in a vacuum drying cabinet.
Preparation of the Inventive Copolyesters (Component A):

Comparative Example C1

Isophthalic acid (434 g, 2.6 mol), terephthalic acid (290 g, 1.7 mol), monoethylene glycol (120 g, 1.9 mol), neopentyl glycol (129 g, 1.2 mol) and hexanediol-1,6 (211 g, 1.8 mol) are melted in a 2 l flask with column and distillation attachment in a nitrogen stream. On attainment of a temperature of 170° C., water begins to distil off. Within 2 hours, the temperature is increased gradually to 240° C. After about 4 further hours at this temperature, the water elimination slows. 150 mg of titanium tetrabutoxide are stirred in and operation is continued under reduced pressure, which is adjusted in the course of the reaction such that distillate is still obtained. On attainment of the desired hydroxyl and acid number range, the reaction is shut down. Characteristics of polyester C1 are shown in Table 1.

Comparative Example C2 and Examples 1-4

The synthesis of polyesters C2 and 1-4 is effected on the basis of Comparative Example C1. In each case, the sole difference is the use of itaconic acid as a comonomer, half of the isophthalic acid and terephthalic acid each being substituted by the amount of itaconic acid used. Characteristics of the polyesters C2 and 1-4 thus obtained are listed in Table 1.

TABLE 1

| Example No. | ITA | OHN | AN | $M_w$ (UV) | PDI (UV) |
|---|---|---|---|---|---|
| C1 | 0 | 20 | 1.2 | 18 900 | 1.7 |
| C2 | 23* | | | Partly crosslinked | |
| 1 | 1 | 36 | 2.6 | 11 700 | 1.9 |
| 2 | 2 | 35 | 1.2 | 13 400 | 2.1 |
| 3 | 3 | 42 | 1.8 | 15 800 | 2.2 |

TABLE 1-continued

| Example No. | ITA | OHN | AN | $M_w$ (UV) | PDI (UV) |
|---|---|---|---|---|---|
| 4 | 7 | 37 | 0.9 | 27 300 | 6.8 |

*soluble fraction
ITA = content of repeat itaconate units in the copolyester based on the total content of polycarboxylic acids, data in mol %, measured by $^1$H NMR spectroscopy
OHN = hydroxyl number, data in mg KOH/g, measured to DIN 53240-2
AN = acid number, data in mg KOH/g, measured to DIN EN ISO 2114
$M_w$ (UV) = mass-average molar mass (GPC, UV detection), data in g/mol
PDI (UV) = polydispersity index (GPC, UV detection)

Preparation of the Inventive Mixtures from Components A, B and AB

Examples of Solution Polymerization

Comparative Example C3

A jacketed vessel with attached thermostat, reflux condenser, paddle stirrer and internal thermometer is initially charged with 42 g of propyl acetate and 13 g of polyester C1. The polyester is dissolved completely at 90° C. with stirring and then admixed with 0.15 g of t-butyl per-2-ethylhexanoate. In order to form an optimal yield of free radicals along the polyester chains, this solution is stirred at 90° C. over a period of 30 min, before 19.2 g of methyl methacrylate and a further 0.15 g of t-butyl per-2-ethylhexanoate are metered in rapidly by means of a metering pump.

After a total reaction time of 150 min, the polymer solution is cooled and diluted with 13.5 g of propyl acetate to reduce the solution viscosity.

Example 5a

Similar procedure to Comparative Example C3 using polyester 1 instead of polyester C1.

Example 5b

Similar procedure to Comparative Example C3 using polyester 2 instead of polyester C1.

Example 5c

A jacketed vessel with attached thermostat, reflux condenser, paddle stirrer and internal thermometer is initially charged with 55 g of propyl acetate and 24 g of polyester 3. The polyester is dissolved completely at 85° C. with stirring and then admixed with 0.5 g of t-butyl per-2-ethylhexanoate. In order to form an optimal yield of free radicals along the polyester chains, this solution is stirred at 85° C. over a period of 30 min before 36.4 g of methyl methacrylate are metered in rapidly by means of a metering pump.

After a total reaction time of 150 min, the polymer solution is cooled and diluted with 13.5 g of propyl acetate to reduce the solution viscosity.

Example 5d

Similar procedure to Comparative Example C3 using polyester 4 instead of polyester C1.

Example 5e

Similar procedure to Example 5d using a smaller amount (7 g) of polyester 4.

Example 6

A jacketed vessel with attached thermostat, reflux condenser, paddle stirrer and internal thermometer is initially charged with 42 g of propyl acetate and 12.8 g of polyester 1. The polyester is dissolved completely at 90° C. with stirring, stirred for 30 min and then admixed with 0.15 g of t-butyl per-2-ethyl-hexanoate. In order to form an optimal yield of free radicals along the polyester chains, this solution is stirred at 90° C. over a period of 30 min before a mixture of 4 g of methyl methacrylate, 12 g of butyl methacrylate and a further 0.15 g of t-butyl per-2-ethylhexanoate is metered in rapidly by means of a metering pump.

Table 2 summarizes the results of the graft experiments from the examples.

TABLE 2

| Example No. | Start polyester | | Graft product | | | |
|---|---|---|---|---|---|---|
| | No. | ITA | $M_w$ (UV) | $ITA_{graft}$ | $M_w$ (UV) | $M_w$ (RI) | PDI (RI) |
| C3 | C1 | 0 | 18 900 | 0 | 18 400 | 28 800 | 2.0 |
| 5a | 1 | 1 | 11 700 | <0.1 | 13 000 | 27 700 | 2.5 |
| 5b | 2 | 2 | 13 400 | 0.5 | 17 000 | 31 600 | 2.7 |
| 5c | 3 | 3 | 15 800 | 0.3 | 105 000 | 149 000 | 6.2 |
| 5d | 4 | 7 | 27 300 | n.d. | partly gelled | | |
| 5e | 4 | 7 | 27 300 | 0.7 | 96 000 | 114 000 | 7.2 |
| 6 | 1 | 1 | 11 700 | n.d. | 12 500 | 30 500 | 2.8 |

$ITA_{graft}$ = content of repeat itaconate units in the copolyester (block) of the graft product based on its total content of polycarboxylic acids, data in mol %, measured with $^1$H NMR spectroscopy
$M_w$ (RI) = mass-average molar mass (GPC, RI detection), data in g/mol
PDI (RI) = polydispersity index (GPC, RI detection)
n.d. = not determined The proof of a successful graft copolymer synthesis arises primarily from the comparison of the itaconate content in the copolyester fraction before and after the (meth)acrylate polymerization. In the correspondingly analysed samples, a decline in the olefinic signals by, for example, 2.7 mol % (Ex. 5c), by 1.5 mol % (Ex. 5b) and by approx. 0.9 mol % (Ex. 5a) is found according to the NMR analysis.

The comparison of the molecular weights $M_w$ of the polyester used and the corresponding UV analysis of the graft products clearly shows an increase in the particular molecular weight. It is also evident from Comparative Example C3 that the comparative values obtained by means of this analysis method are entirely meaningful with regard to a grafting. It can also be discerned from the examples adduced that, in the event of too small an itaconate fraction in the polyester, grafting proceeds only to a low degree and predominantly methacrylate homopolymers are formed (see Ex. 5a and 5b). In the case of too high a double bond content, in contrast, there is the risk of partial gelling of the product mixture (Ex. 5d).

As Example 5e demonstrates, the risk of crosslinking in the case of higher itaconate contents in the polyester can be compensated by a reduction of the polyester fraction in the reaction mixture for the grafting reaction and hence of the overall itaconate content. This shows that, in the present invention, in addition to the determination of an optimal itaconate content in the polyester, the total itaconate content in the reaction mixture for the synthesis of the inventive graft copolymers also has to be optimized.

In addition, the proof of a graft copolymerization arises from the following results for Ex. 5c. The polyester and PMMA used are fundamentally immiscible. Thus, in a phase-separated product, glass transition temperatures of approx. 32° C. ($T_g$ of the polyester 3 used) and approx. 105° C. ($T_g$ of PMMA) would be expected. In fact, however, the values of 14° C. and 78° C. found in the DSC analysis are significantly lower, which indicates compatibilization of the components in the product. In contrast, no such effect can be detected in the case of only a low yield of graft copolymers.

Especially by means of Example 5c, a solution to the problem stated has been developed. The dispersion-like solution described is still stable even after storage for more than five months. In samples with appropriately adjusted degree of grafting, compatibilization between actually incompatible polyesters and polymethacrylates is thus clearly realizable. It is thus possible with a low content of such graft copolymers to realize polymer mixtures of poly(meth)acrylates and polyesters. The possible use spectrum of such blends is considered to be very comprehensive. As uncrosslinked systems, their use is conceivable, for example, as a binder in heat-sealing coatings. In postcrosslinking form as a result of addition of suitable additives, uses in the sealant sector are conceivable. Moreover, uses as a coating formulation such as powder coatings are also possible. The use of such formulations in the use sectors addressed allows significant widening of the profiles of properties.

Examples of Bulk Polymerization

Examples 7-9

Monomer and polyester 1 are weighed in the amounts specified in Table 3 into a flask with stirrer, heated to 80° C. and stirred until a homogeneous liquid is present. The polymerization is initiated by subsequent addition of 0.02 g of t-butyl per-2-ethylhexanoate. After one hour, the product which is now solid is cooled. The results are summarized in Table 3.

TABLE 3

| Example | Monomer: polyester | Monomer | $M_w$ (UV) | $M_w$ (RI) | Polyester $M_w$ (UV) |
|---|---|---|---|---|---|
| 7 | 9 g/1 g | MMA | 12 800 | 25 200 | 11 700 |
| 8 | 9 g/1 g | n-BA | 12 400 | 77 300 | |
| 9 | 7.5 g/2.5 g | n-BA | 14 000 | 16 100 | |

MMA: methyl methacrylate
n-BA: n-butyl acrylate

All eluograms in the UV detection are monomodal. RI detection leads to multimodal eluograms.

A comparison of RI and UV detection of the individual GPC results for the examples adduced shows that especially the grafting of n-BA onto the polyester of type 1 was successful. The same applies to the reaction of the less active MMA.

The invention claimed is:

1. A composition, comprising:
   three different polymers A, B and AB, and
   comprising no styrene and no styrene derivative
   wherein
   polymer A is a copolyester prepared by cocondensation of itaconic acid,
   polymer B is a (meth)acrylate homo- and/or copolymer comprising methacrylates and/or acrylates,
   polymer AB is a graft copolymer comprising polymer A and polymer B, and
   an amount of polymer A is between 5% by weight and 80% by weight,
   an amount of polymer B is between 5% by weight and 80% by weight,
   an amount of polymer AB is between 10% by weight and 80% by weight, based on a total mass of A, B, AB.

2. The composition according to claim 1,
   wherein
   the amount of polymer A is between 5% by weight and 60% by weight,
   the amount of polymer B is between 5% by weight and 60% by weight,
   the amount of polymer AB is between 20% by weight and 65% by weight, based on the total mass of A, B, AB.

3. The composition according to claim 2,
   wherein
   the amount of polymer A is between 5% by weight and 40% by weight,
   the amount of polymer B is between 5% by weight and 40% by weight,
   the amount of polymer AB is between 30% by weight and 50% by weight, based on the total mass of A, B, and AB.

4. The composition according to claim 1, wherein polymer A is a polyester whose content of itaconic acid, based on a total amount of polycarboxylic acids, is between 0.1 mol % and 20 mol %.

5. The composition according to claim 4, wherein polymer A is a polyester whose content of itaconic acid, based on the total amount of polycarboxylic acids, is between 1 mol % and 10 mol %.

6. The composition according to claim 5, wherein polymer A is a polyester whose content of itaconic acid, based on the total amount of polycarboxylic acids, is between 2 mol % and 8 mol %.

7. The composition according to claim 1, wherein polymer AB comprises graft copolymers with polyester main chains and poly(meth)acrylate side chains.

8. The composition according to claim 7, wherein an average content of poly(meth)acrylate contents in an overall mixture is between 20% by weight and 80% by weight.

9. The composition according to claim 8, wherein the average content of poly(meth)acrylate contents in the overall mixture is between 30% by weight and 70% by weight.

10. The composition according to claim 9, wherein the average content of poly(meth)acrylate contents in the overall mixture is between 40% by weight and 60% by weight.

11. The composition according to claim 7, wherein polymer AB is a compatibilizer between poly(meth)acrylates and polyesters.

12. A sealant formulation, comprising: the composition according to claim 1.

13. A formulation of a heat-sealing coating, comprising the composition according to claim 1.

* * * * *